United States Patent
Imura et al.

(10) Patent No.: US 8,924,100 B2
(45) Date of Patent: Dec. 30, 2014

(54) HYBRID CONSTRUCTION MACHINE

(75) Inventors: Shinya Imura, Toride (JP); Seiji Ishida, Hitachinaka (JP); Hidetoshi Satake, Ishioka (JP); Takako Satake, legal representative, Ishioka (JP); Yusuke Kajita, Ushiku (JP); Kazuo Fujishima, Tsuchiura (JP); Takatoshi Ooki, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/817,913

(22) PCT Filed: Aug. 18, 2011

(86) PCT No.: PCT/JP2011/068694
§ 371 (c)(1),
(2), (4) Date: Apr. 15, 2013

(87) PCT Pub. No.: WO2012/032909
PCT Pub. Date: Mar. 15, 2012

(65) Prior Publication Data
US 2013/0197768 A1 Aug. 1, 2013

(30) Foreign Application Priority Data
Sep. 8, 2010 (JP) .................................. 2010-201102

(51) Int. Cl.
| B60W 20/00 | (2006.01) |
| G06F 17/00 | (2006.01) |
| B60W 10/06 | (2006.01) |
| B60W 10/08 | (2006.01) |
| B60W 10/103 | (2012.01) |
| E02F 9/20 | (2006.01) |
| E02F 9/22 | (2006.01) |
| F02D 29/04 | (2006.01) |
| F02D 31/00 | (2006.01) |
| F02D 41/02 | (2006.01) |

(52) U.S. Cl.
CPC ............... *G06F 17/00* (2013.01); *B60W 10/06* (2013.01); *B60W 10/08* (2013.01);
(Continued)

(58) Field of Classification Search
CPC ......... E02F 9/20; E02F 9/2062; E02F 9/2075; E02F 9/2091; E02F 9/22; E02F 9/2217; E02F 9/2221; E02F 9/2228; E02F 9/2232; B60W 20/00; B60W 20/10
See application file for complete search history.

(56) References Cited

U.S. PATENT DOCUMENTS 6,020,651 A * 2/2000 Nakamura et al. .......... 290/40 R
6,708,787 B2 * 3/2004 Naruse et al. ............. 180/53.8
(Continued)

FOREIGN PATENT DOCUMENTS

| JP | 2003-28071 | 1/2003 |
| JP | 2004-150305 | 5/2004 |

(Continued)

*Primary Examiner* — Jonathan M Dager
(74) *Attorney, Agent, or Firm* — Antonelli, Terry, Stout & Kraus, LLP.

(57) ABSTRACT

A hybrid construction machine is provided with a variable displacement hydraulic pump 1 which supplies hydraulic oil to a hydraulic actuator, an engine 2 which is provided to be able to drive and rotate the hydraulic pump 1, an electric motor 3 which is provided to be able to drive and rotate the hydraulic pump 1, an engine control dial 4, a controller 4 and an operating lever 5. The controller changes the rotation speed of the engine 2 to reduce fuel consumption according to power generated by the engine 2, and changes displacement of the hydraulic pump 1 based on the rotation speed of the engine 2, the dial position of the engine control dial 4 and the amount of operation on the operating lever 5.

7 Claims, 7 Drawing Sheets

(52) U.S. Cl.
CPC ............ *B60W 10/103* (2013.01); *B60W 20/00* (2013.01); *E02F 9/2075* (2013.01); *E02F 9/2235* (2013.01); *F02D 29/04* (2013.01); *F02D 31/007* (2013.01); *F02D 41/021* (2013.01); *E02F 9/2246* (2013.01); *B60W 2300/17* (2013.01); *Y02T 10/56* (2013.01); *Y02T 10/6286* (2013.01)
USPC ................................. 701/50; 701/36; 701/48

(56) References Cited

U.S. PATENT DOCUMENTS

| | | | |
|---|---|---|---|
| 6,820,356 B2 * | 11/2004 | Naruse et al. | 37/348 |
| 7,058,495 B2 * | 6/2006 | Budde et al. | 701/50 |
| 8,534,264 B2 * | 9/2013 | Kawaguchi et al. | 123/350 |
| 2002/0125052 A1 * | 9/2002 | Naruse et al. | 180/53.8 |
| 2003/0221339 A1 * | 12/2003 | Naruse et al. | 37/348 |
| 2003/0226291 A1 * | 12/2003 | Naruse et al. | 37/348 |
| 2005/0065689 A1 * | 3/2005 | Budde et al. | 701/50 |
| 2006/0243260 A1 * | 11/2006 | Ichijo et al. | 123/559.3 |
| 2008/0300757 A1 * | 12/2008 | Kanayama et al. | 701/50 |
| 2009/0301075 A1 * | 12/2009 | Morinaga et al. | 60/459 |
| 2009/0320461 A1 * | 12/2009 | Morinaga et al. | 60/431 |
| 2010/0031650 A1 * | 2/2010 | Morinaga et al. | 60/459 |
| 2010/0064677 A1 * | 3/2010 | Kawaguchi et al. | 60/431 |
| 2010/0071973 A1 * | 3/2010 | Morinaga et al. | 180/65.265 |
| 2012/0004797 A1 * | 1/2012 | Baino et al. | 701/22 |
| 2012/0315119 A1 * | 12/2012 | Magaki et al. | 414/685 |
| 2013/0090835 A1 * | 4/2013 | Take et al. | 701/103 |
| 2013/0190960 A1 * | 7/2013 | Kawashima | 701/22 |
| 2013/0325268 A1 * | 12/2013 | Ishihara et al. | 701/50 |
| 2013/0345939 A1 * | 12/2013 | Magaki et al. | 701/50 |

FOREIGN PATENT DOCUMENTS

| | | |
|---|---|---|
| JP | 2007-290607 | 11/2007 |
| JP | 2009-74406 | 4/2009 |
| WO | WO 2007/049767 A1 | 5/2007 |
| WO | WO 2009/038016 A1 | 3/2009 |

* cited by examiner

HYBRID CONSTRUCTION MACHINE

TECHNICAL FIELD

The present invention relates to a hybrid construction machine in which a hydraulic pump as a hydraulic source for a hydraulic actuator is driven by both an engine and an electric motor. Particularly, it relates to a unit for reducing fuel consumption without changing the operability of the hydraulic actuator.

BACKGROUND ART

In recent years, an energy saving trend on industrial products has been strong in order to deal with the environmental problem, the problem of rise in the price of crude oil, etc. In response to the trend, hybridization using an engine and an electric motor together has been also examined in construction machines whose mainstream is a system in which a hydraulic drive system is heretofore driven only by an engine. By hybridization of a construction machine, it is possible to expect not only the effect of reduction in exhaust gas but also the effect of energy saving, including engine's high efficiency drive, improvement of efficiency in transmission, and recovery of regenerative electric power.

In the background art, as a hybrid construction machine of this type, there has been proposed a hybrid construction machine, in which an electric motor (generator motor) is driven to engage in motoring or regenerating in accordance with power absorbed by a hydraulic pump so as to change the power distribution between an engine and the electric motor and operate the engine in a high-efficiency range in order to reduce the fuel consumption (for example, see Patent Literature 1).

CITATION LIST

Patent Literature

Patent Literature 1: JP-A-2007-290607

SUMMARY OF INVENTION

Technical Problem

In order to further reduce the fuel consumption in the hybrid construction machine disclosed in Patent Literature 1, the rotation speed of the engine may be changed in accordance with the power absorbed by the hydraulic pump. However, when the rotation speed of the engine is changed in the configuration disclosed in Patent Literature 1, the discharge flow rate of the hydraulic pump also changes so that operation on the hydraulic actuator in response to the amount of operation on a lever differs from that in an ordinary construction machine that is not hybrid. Thus, a feeling of strangeness on operation may be given to an operator.

An object of the present invention is to provide a hybrid construction machine which can provide the same operation feeling as an ordinary construction machine that is not hybrid without changing the discharge flow rate of a hydraulic pump even when the rotation speed of an engine is changed according to power absorbed by the hydraulic pump.

Solution to Problem

In order to solve the foregoing problem, according to the invention, there is provided a hybrid construction machine including: a variable displacement hydraulic pump which discharges hydraulic oil for a hydraulic actuator; an engine which drives the hydraulic pump; an electric motor which is driven by the engine to charge generated electric power into an electric storage device and which is driven by the electric power charged in the electric storage device so as to assist the engine to drive the hydraulic pump; and a controller which controls driving of the hydraulic pump, the engine and the electric motor; characterized in that: the controller includes an engine power calculating unit which calculates power generated by the engine, a first rotation speed calculating unit which calculates a first rotation speed of the engine to minimize fuel required for generating the engine power, a second rotation speed calculating unit which calculates a second rotation speed which is a lower limit of a target rotation speed of the engine, a target rotation speed calculating unit which calculates the target rotation speed of the engine based on the first rotation speed and the second rotation speed, and an engine control unit which controls the engine so as to make a real rotation speed of the engine close to the target rotation speed.

In addition, according to the invention, there is provided a hybrid construction machine in the aforementioned configuration, characterized in that: the controller further includes a target flow rate calculating unit which calculates a target flow rate of the hydraulic oil discharged from the hydraulic pump, and a hydraulic pump control unit which controls displacement of the hydraulic pump based on the target flow rate and the real rotation speed of the engine.

In addition, according to the invention, there is provided a hybrid construction machine in the aforementioned configuration, characterized in that: the controller further includes a target flow rate calculating unit which calculates a target flow rate of the hydraulic oil discharged from the hydraulic pump, and a hydraulic pump control unit which controls displacement of the hydraulic pump based on the target flow rate and the target rotation speed of the engine.

In addition, according to the invention, there is provided a hybrid construction machine in the aforementioned configuration, characterized in that: the target flow rate calculating unit calculates the target flow rate based on a dial position of an engine control dial and an amount of operation on an operating lever.

In addition, according to the invention, there is provided a hybrid construction machine in the aforementioned configuration, characterized in that: the engine power calculating unit calculates the engine power based on an amount of fuel injection in the engine and the rotation speed of the engine.

In addition, according to the invention, there is provided a hybrid construction machine in the aforementioned configuration, characterized in that: the engine power calculating unit calculates the engine power based on the discharge flow rate and a discharge pressure of the hydraulic pump, the power of the electric motor and a load of accessories.

In addition, according to the invention, there is provided a hybrid construction machine in the aforementioned configuration, characterized in that: a target maximum total power calculating unit which calculates a target maximum value of total power of the engine and the electric motor is provided; and the second rotation speed calculating unit calculates a minimum rotation speed of the engine required for generating the target maximum total power in the engine and the electric motor.

In addition, according to the invention, there is provided a hybrid construction machine in the aforementioned configuration, characterized in that: the target maximum total power calculating unit calculates the target maximum total power based on a dial position of an engine control dial.

In addition, according to the invention, there is provided a hybrid construction machine in the aforementioned configuration, characterized in that: a third rotation speed calculating unit which calculates a minimum rotation speed of the engine required for securing a target flow rate of the hydraulic pump is further provided; and the target rotation speed calculating unit selects a largest value from a first rotation speed outputted from the first rotation speed calculating unit, a second rotation speed outputted from the second rotation speed calculating unit and a third rotation speed outputted from the third rotation speed calculating unit.

In addition, according to the invention, there is provided a hybrid construction machine in the aforementioned configuration, characterized in that: the second rotation speed calculating unit calculates a minimum rotation speed of the engine required for securing a target flow rate of the hydraulic pump.

Moreover, according to the invention, there is provided a hybrid construction machine including: a variable displacement hydraulic pump which discharges hydraulic oil for a hydraulic actuator; an engine which drives the hydraulic pump; an electric motor which is driven by the engine to charge generated electric power into an electric storage device and which is driven by the electric power charged in the electric storage device so as to assist the engine to drive the hydraulic pump; and a controller which controls driving of the hydraulic pump, the engine and the electric motor; characterized in that: a rotation speed of the engine increases when power generated by the engine increases, and the rotation speed of the engine decreases when the power generated by the engine decreases.

In addition, according to the invention, there is provided a hybrid construction machine in the aforementioned configuration, characterized in that: displacement of the hydraulic pump increases when an amount of operation on an operating level increases or when the rotation speed of the engine decreases, and the displacement of the hydraulic pump decreases when the amount of operation on the operating level decreases or when the rotation speed of the engine increases.

Advantageous Effects of Invention

According to the present invention, the target rotation speed (real rotation speed) of the engine increases in accordance with the increase of engine power so that the fuel consumption can be reduced. In addition, the tilting angle of the hydraulic pump decreases in accordance with the increase of the engine rotation speed so that the discharge flow rate of hydraulic oil discharged from the hydraulic pump can be made constant. Thus, the operation on the hydraulic actuator in response to the amount of operation on the lever can be made similar to that in an ordinary construction machine that is not hybrid.

DESCRIPTION OF EMBODIMENTS

Embodiments of hybrid construction machines according to the invention will be described below while hydraulic excavators are taken as examples.

EXAMPLE 1

Figure 1:
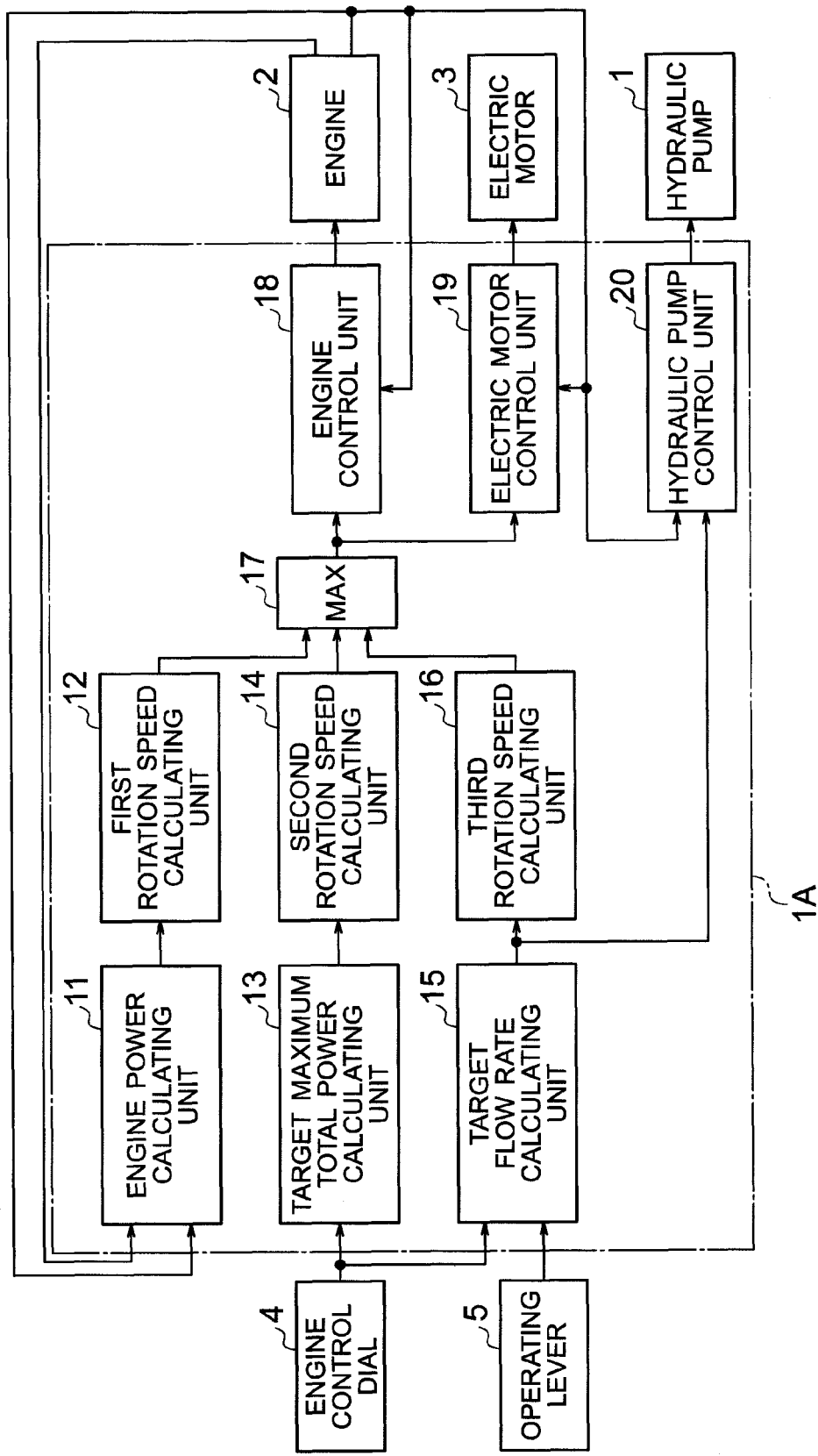
FIG. 1 A block diagram showing the system configuration of a hybrid construction machine according to Example 1.

As shown in FIG. 1, a hybrid construction machine according to Example 1 has a variable displacement hydraulic pump 1 which discharges hydraulic oil for a not-shown hydraulic actuator, an engine 2 which drives the hydraulic pump 1, an electric motor 3 which is driven by the engine to charge generated electric power into a not-shown electric storage device and which is driven by the electric power charged in the not-shown electric storage device so as to assist the engine 2 to drive the hydraulic pump 1, and a controller 1A which controls driving of the hydraulic pump 1, the engine 2 and the electric motor 3. Further, the hybrid construction machine has an engine control dial (hereinafter abbreviated to "EC dial") 4 operated by an operator, and an operating lever 5.

The controller 1A includes an engine power calculating unit 11 which calculates power generated by the engine 2, a first rotation speed calculating unit 12 which calculates a real rotation speed of the engine to minimize fuel required for generating the engine power, a target maximum total power calculating unit 13 which calculates a target maximum value of total power of the engine 2 and the electric motor 3, a second rotation speed calculating unit 14 which determines a lower limit of a target rotation speed of the engine 2, a target flow rate calculating unit 15 which calculates a target flow rate of the hydraulic oil discharged from the hydraulic pump 1, a third rotation speed calculating unit 16 which calculates a minimum rotation speed of the engine required for securing the target flow rate of the hydraulic pump 1, a target rotation speed calculating unit 17 which selects a largest value from the first rotation speed calculated by the first rotation speed calculating unit 12, the second rotation speed calculated by the second rotation speed calculating unit 14 and the third rotation speed calculated by the third rotation speed calculating unit 16, an engine control unit 18 which controls the engine 3 so as to make the real rotation speed of the engine close to the target rotation speed calculated by the target rotation speed calculating unit 17, an electric motor control unit 19 which controls torque generated in the electric motor 3 so as to make the real rotation speed of the engine 2 close to the target rotation speed calculated by the target rotation speed calculating unit 17, and a hydraulic pump control unit 20 which controls a tilting amount (displacement) of the hydraulic pump 1 based on the target flow rate outputted from the target flow rate calculating unit 15 and the real rotation speed of the engine 2.

The variable displacement hydraulic pump 1 supplies hydraulic oil to a not-shown hydraulic actuator such as a boom, an arm, a bucket, etc. The displacement (amount of hydraulic oil discharged by one turn) of the hydraulic pump 1 can be changed by changing the tilting angle of a swash plate.

The engine 2 is mechanically connected to the hydraulic pump 1 so that the engine 2 can drive and rotate the hydraulic pump 1. The engine 2 consumes fuel stored in a not-shown fuel tank and generates power. The power can be changed by changing the amount of fuel injection.

The electric motor 3 is mechanically connected to the hydraulic pump 1 so that the electric motor 3 can drive and rotate the hydraulic pump 1. Thus, the electric motor 3 is also mechanically connected to the engine 2. The electric motor 3 may consume electric power of a not-shown electric storage device to generate power (motor), and may absorb inertial energy or the power generated in the engine 2 so as to generate (regenerate) power and store the power into the electric storage device.

The EC dial 4 is designed so that the dial position thereof can be changed by an operator. In an ordinary hydraulic excavator that is not hybrid, the target rotation speed of the engine 2 is determined based on the dial position of the EC dial 4. In the invention, however, the target maximum total power of the engine 2 and the electric motor 3 is determined based on the dial position of the EC dial 4. The method for determining the target maximum total power will be described later.

The operating lever 5 is provided for allowing the operator to operate a hydraulic actuator such as a boom, an arm, a bucket, etc.

Figure 2:
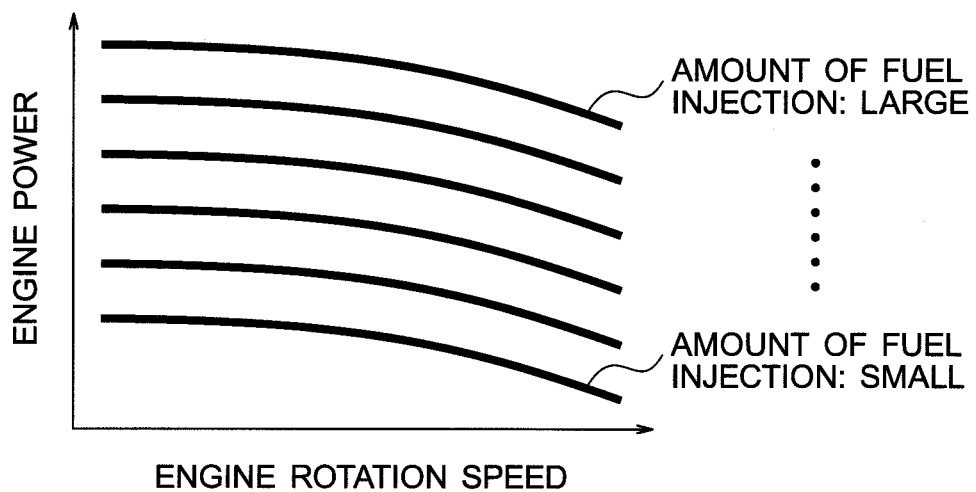
FIG. 2 A graph showing an example of a map provided in an engine power calculating unit.

The engine power calculating unit 11 calculates the engine power based on the fuel injection amount and the rotation speed of the engine 2, for example, using a map shown in FIG. 2. The map is set based on the relationship among the fuel injection amount, the rotation speed and the generated power of the engine 2, which relationship is obtained by experiments or the like in advance.

Figure 3:
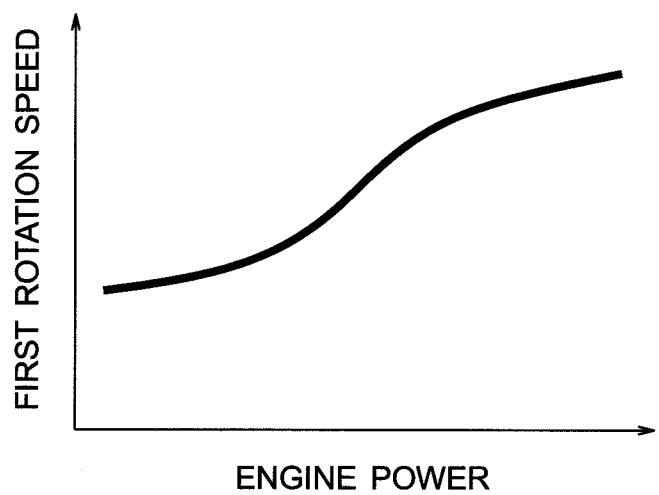
FIG. 3 A graph showing an example of a map provided in a first rotation speed calculating unit.

The first rotation speed calculating unit 12 calculates the first rotation speed which will be described below, based on the engine power calculated by the engine power calculating unit 11, for example, using a map shown in FIG. 3. That is, in the map, the engine rotation speed to minimize fuel required for generating each power of the engine 2 is set as the first rotation speed based on the relationship between the power and the engine rotation speed, which relationship is obtained by experiments or the like in advance.

Figure 4:
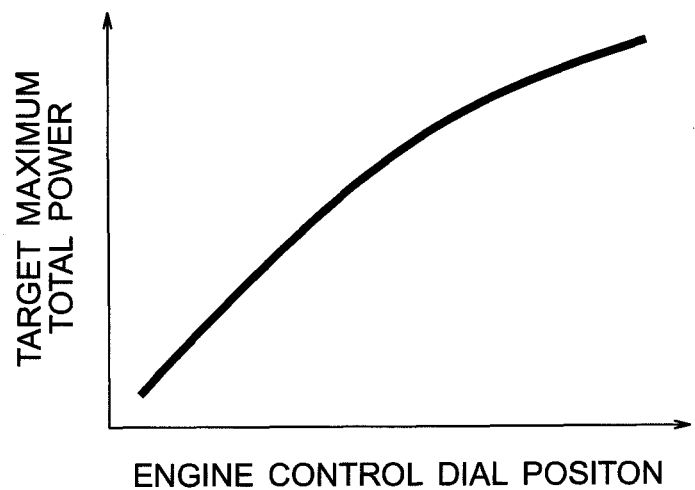
FIG. 4 A graph showing an example of a map provided in a target maximum total power calculating unit.

The target maximum total power calculating unit 13 calculates the target maximum total power based on the dial position of the EC dial 4, for example, using a map shown in FIG. 4. In the map, a maximum power that can be generated in each dial position of the EC dial 4 by an engine in an ordinary hydraulic excavator that is not hybrid is set as the target maximum total power based on the relationship between the dial position and the maximum power, which relationship is obtained by experiments or the like in advance. In this description, the "ordinary hydraulic excavator that is not hybrid" means a model whose engine power is substantially equal to the total power of the engine 2 and the electric motor 3 according to the invention.

Figure 5:
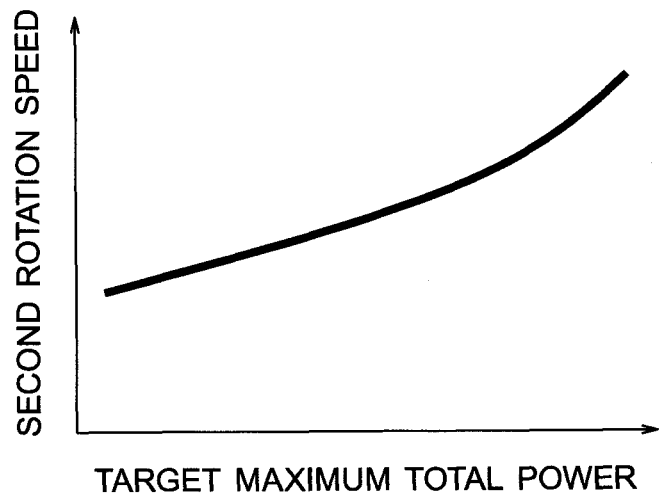
FIG. 5 A graph showing an example of a map provided in a second rotation speed calculating unit.

The second rotation speed calculating unit 14 calculates the following second rotation speed based on the target maximum total power calculated by the target maximum total power calculating unit 13, for example, using a map shown in FIG. 5. That is, in the map, each total power of the engine 2 and the electric motor 3 and the minimum engine rotation speed required for generating the power are set as the target maximum total power and the second rotation speed respectively based on the relationship between the total power and the minimum engine rotation speed, which relationship is obtained by experiments or the like in advance.

Figure 6:
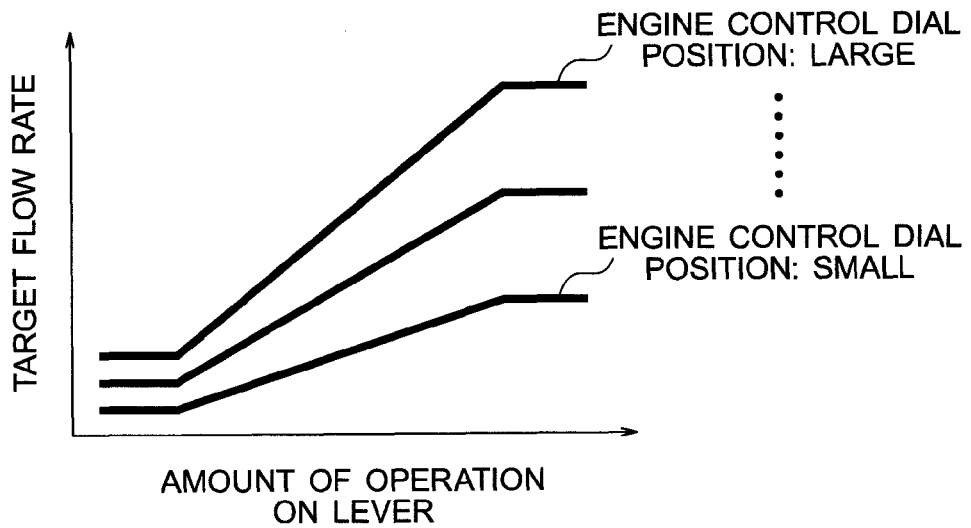
FIG. 6 A graph showing an example of a map provided in a target flow rate calculating unit.

The target flow rate calculating unit 15 calculates the target flow rate based on the dial position of the EC dial 4 and the amount of operation on the operating lever 5, for example, using a map shown in FIG. 6. In the map, each flow rate of a hydraulic pump in an ordinary hydraulic excavator that is not hybrid is set as the target flow rate based on the relationship among the dial position of the EC dial 4, the amount of operation on the operating lever 5 and the flow rate, which relationship is obtained by experiments or the like in advance.

Figure 7:
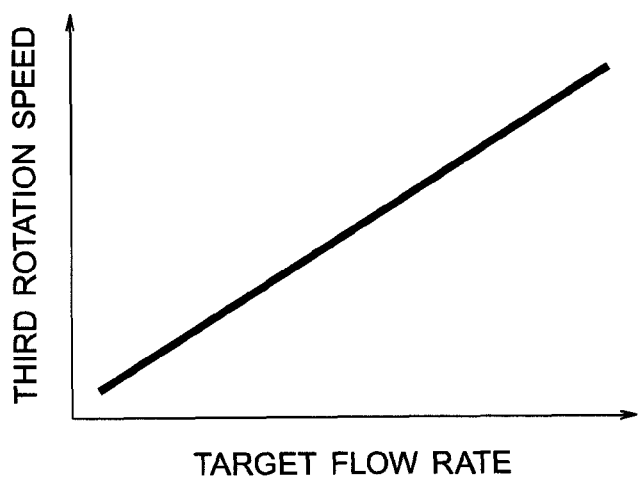
FIG. 7 A graph showing an example of a map provided in a third rotation speed calculating unit.
Figure 8A:
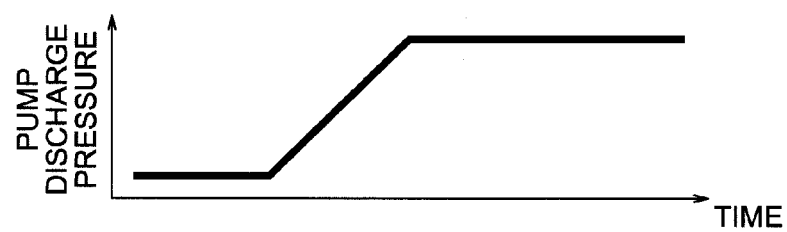
FIG. 8 A graph showing the operation of the invention.
Figure 8B:
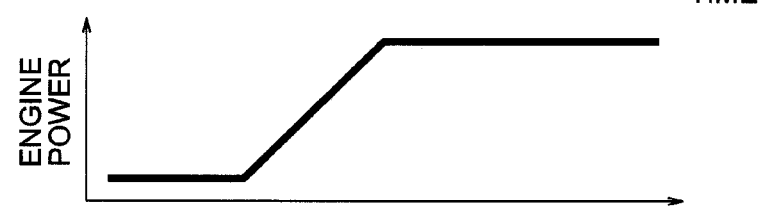
Figure 8C:
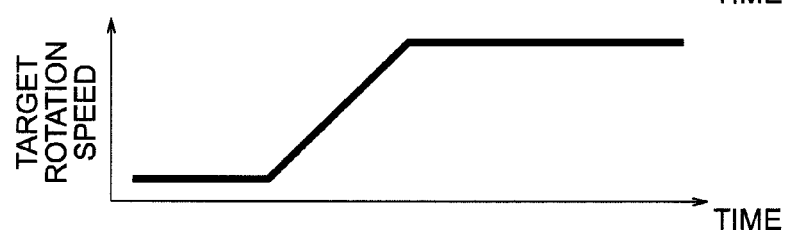
Figure 8D:
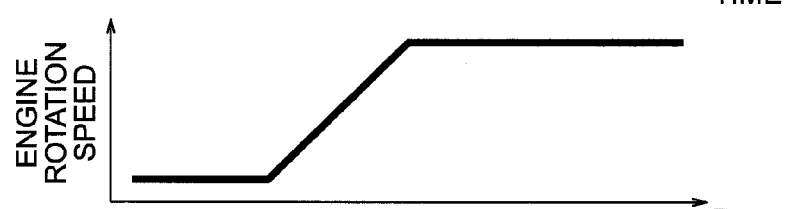
Figure 8E:
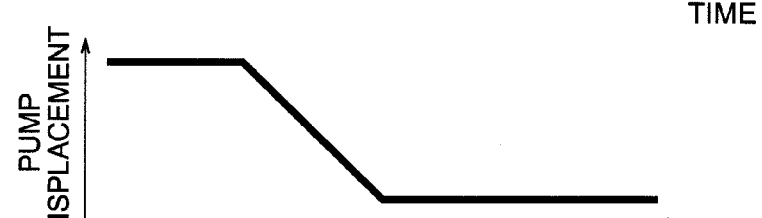
Figure 8F:
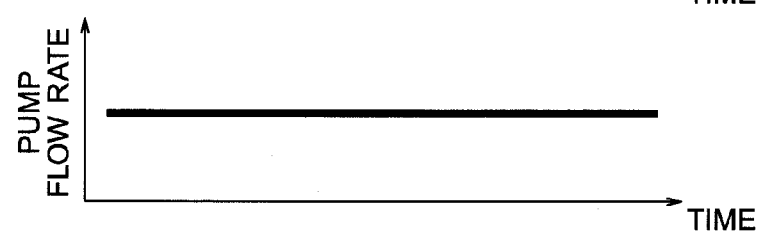

The third rotation speed calculating unit 16 calculates the following third rotation speed based on the target flow rate calculated by the target flow rate calculating unit 15, for example, using a map shown in FIG. 7. In the map, each flow rate of the hydraulic pump 1 and the minimum engine rotation speed required for securing the flow rate are set as the target flow rate and the third rotation speed based on the relationship between the flow rate and the engine rotation speed, which relationship is obtained by experiments or the like in advance.

The target rotation speed calculating unit 17 selects the largest value from the first rotation speed, the second rotation speed and the third rotation speed.

The engine control unit 18 controls the fuel injection amount or the fuel injection timing of the engine 2 so as to make the real rotation speed of the engine 2 close to the target rotation speed calculated by the target rotation speed calculating unit 17. For example, the rotation speed, the deviation of the target rotation speed and the integrated value of the deviation are multiplied by gains respectively, and fuel corresponding to a value obtained by the sum of those values is injected.

The electric motor control unit 19 controls torque generated in the electric motor 3 so as to make the real rotation speed of the engine 2 close to the target rotation speed calculated by the target rotation speed calculating unit 17. For example, the rotation speed, the deviation of the target rotation speed and the integrated value of the deviation are multiplied by gains respectively, and torque corresponding to a value obtained by the sum of those values is generated. Torque generated in the electric motor 3 may be made high when the remaining amount of electric power in the electric storage device is large. Torque generated in the electric motor 3 may be made low or electric power may be generated when the remaining amount of electric power is small.

Based on the real rotation speed of the engine 2 and the target flow rate calculated by the target flow rate calculating unit 15, the hydraulic pump control unit 20 calculates a target tilting angle of the hydraulic pump 1 using a map so as to change the tilting angle. The map is set based on the relationship among the engine rotation speed, the tilting angle and the flow rate, which relationship is obtained by experiments or the like in advance. The tilting angle is changed by hydraulic control or electric control. In the case of the hydraulic control, an electromagnetic valve is driven to control hydraulic pressure for changing the tilting angle. In the case of the electric control, an electric motor (another electric motor than the electric motor 3) for changing the tilting angle is driven to change the tilting angle.

Restriction may be put on the change of the tilting angle by the hydraulic pump control unit 20 so as to prevent the power absorbed by the hydraulic pump 1 from exceeding the target maximum total power calculated by the target maximum total power calculating unit 13. Alternatively, restriction may be put on the target flow rate calculated by the target flow rate calculating unit 15 using a value obtained by dividing the target maximum total power by the discharge pressure of the hydraulic pump 1.

Although one single hydraulic pump 1 is provided in the example of FIG. 1, a plurality of hydraulic pumps 1 may be provided. In that case, the same number of target flow rate calculating units 15 and the same number of hydraulic pump control units 20 as the number of hydraulic pumps 1 are provided. In addition, the third rotation speed calculating unit 16 calculates the third rotation speed based on the highest target flow rate of the target flow rates calculated by the target flow rate calculating units 15.

The operation of the hybrid construction machine according to Example 1 will be described below with reference to FIG. 8. This example illustrates an example in which the fuel consumption becomes lower as the rotation speed increases when high power is generated by the engine 2.

When the discharge pressure of the hydraulic pump 1 increases due to increase in load on the hydraulic actuator in a period in which the dial position of the EC dial 4 and the amount of operation on the operating lever 5 are fixed as shown in (a) of FIG. 8, the engine power increases correspondingly as shown in (b) of FIG. 8. When the engine power increases, the first rotation speed and the target rotation speed increase correspondingly as shown in (c) of FIG. 8. On this occasion, the second rotation speed and the third rotation speed remain unchanged because the dial position of the EC dial 4 and the amount of operation on the operating lever 5 are fixed. When the target rotation speed increases, the engine rotation speed increases correspondingly as shown in (d) of FIG. 8 so that the fuel consumption can be suppressed to minimum. In addition, when the engine rotation speed increases, the displacement of the hydraulic pump 1 decreases correspondingly as shown in (e) of FIG. 8. As a result, the flow rate of the hydraulic pump 1 becomes constant as shown in (f) of FIG. 8. Thus, the operation of the hydraulic actuator in response to the amount of operation on the lever can be made similar to that in an ordinary construction machine that is not hybrid.

EXAMPLE 2

Figure 9:
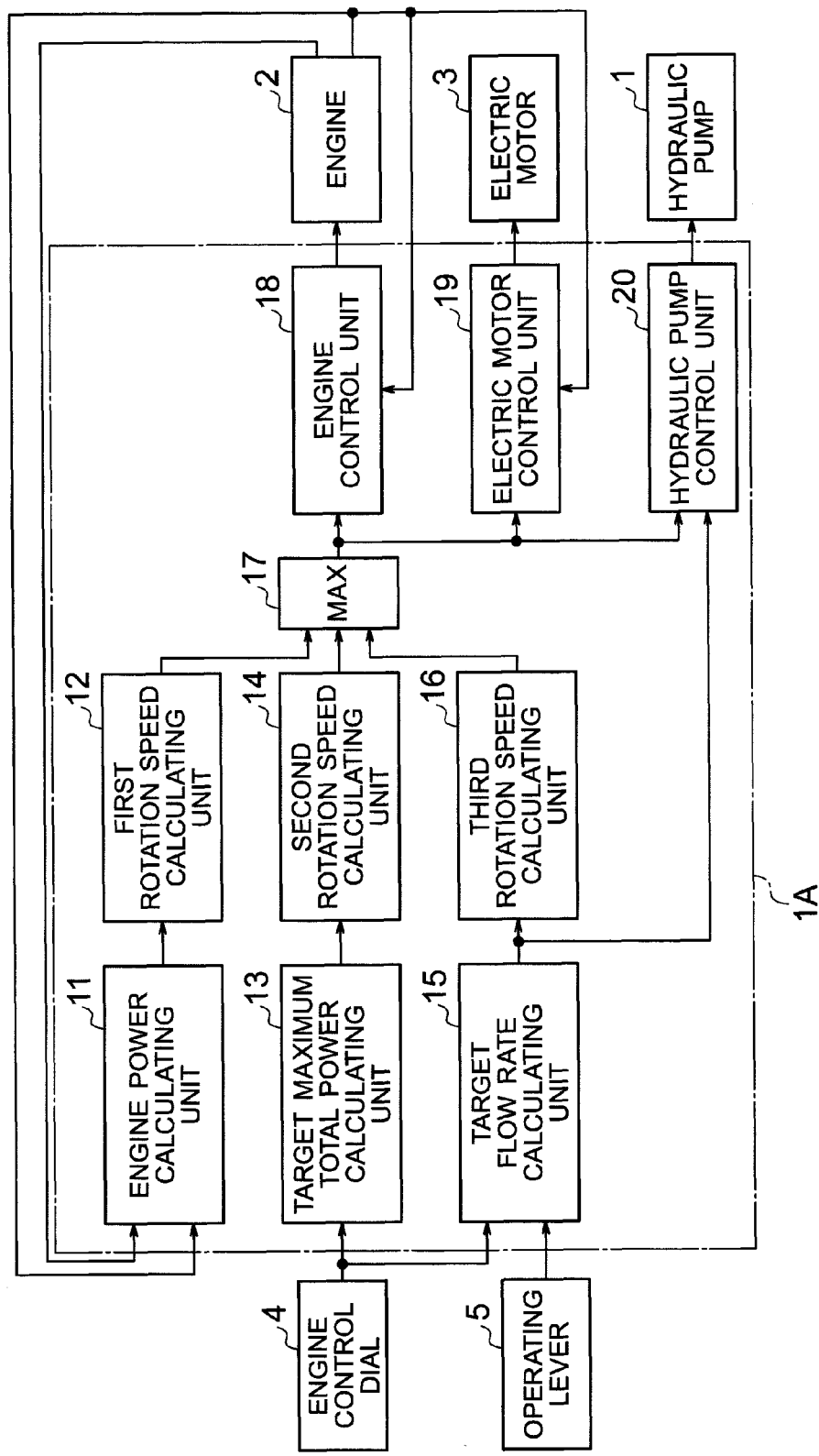
FIG. 9 A block diagram showing the system configuration of a hybrid construction machine according to Example 2.

Next, the configuration of a hybrid construction machine according to Example 2 will be shown with reference to FIG. 9. As is apparent from this drawing, Example 2 of the invention is characterized in that the target rotation speed calculated by the target rotation speed calculating unit 17 is used in the hydraulic pump control unit 20 in place of the real rotation speed of the engine 2. The remaining is the same as that in the hybrid construction machine according to Example 1. Therefore, like parts are referred to by like signs correspondingly, and description thereof will be omitted. The target rotation speed changes more quickly than the real rotation speed. Example 2 is therefore effective in the case where it takes much time to change the tilting angle of the hydraulic pump 1.

EXAMPLE 3

Figure 10:
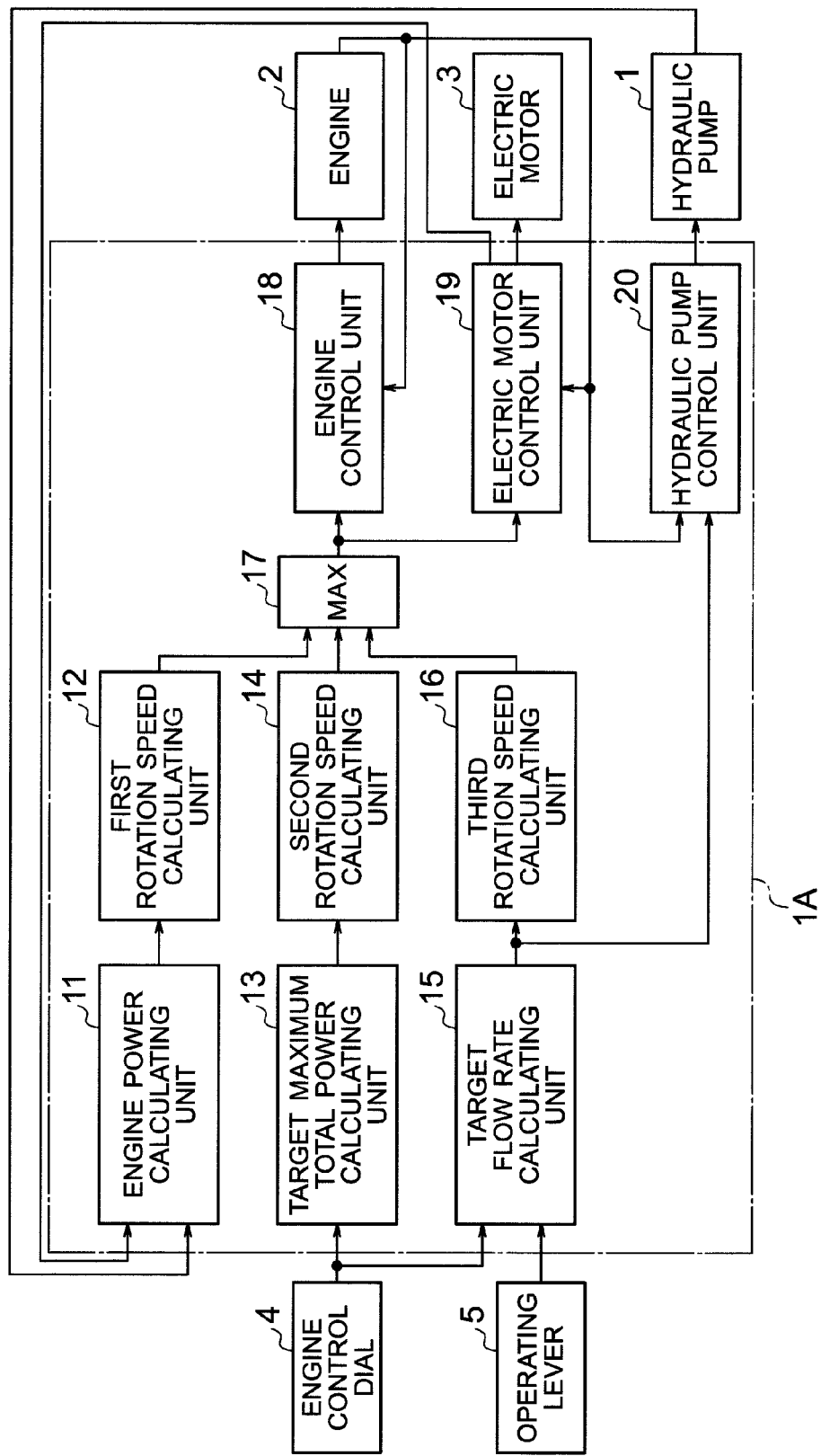
FIG. 10 A block diagram showing the system configuration of a hybrid construction machine according to Example 3.

Next, the configuration of a hybrid construction machine according to Example 3 will be shown with reference to FIG. 10. As is apparent from this drawing, Example 3 of the invention is characterized in that the flow rate and the discharge pressure of the hydraulic pump 1, the power of the electric motor 3 and the load of accessories such as an air conditioner are used in the engine power calculating unit 11 in place of the fuel injection amount and the rotation speed of the engine 2.

That is, the engine power calculating unit 11 in Example 3 first multiplies the flow rate and the discharge pressure of the hydraulic pump 1 so as to calculate the power absorbed by the hydraulic pump 1. Next, the engine power calculating unit 11 calculates the power generated by the electric motor 3 based on the output of the electric motor control unit 19. Next, the engine power calculating unit 11 calculates the power consumed by accessories such as an air conditioner, for example, based on the condition of a switch of the air conditioner. Finally, the engine power calculating unit 11 sets, as the engine power, a value obtained by subtracting the power generated by the electric motor 3 from the sum of the power absorbed by the hydraulic pump 1 and the power consumed by the accessories. The remaining is the same as that in the hybrid construction machine according to Example 1. Therefore, like parts are referred by like signs correspondingly, and description thereof will be omitted.

In the engine power calculating unit 11, the target flow rate calculated by the target flow rate calculating unit 15 may be used in place of the flow rate of the hydraulic pump 1. In addition, in the same manner as in Example 2, the target rotation speed calculated by the target rotation speed calculating unit 17 may be used in the hydraulic pump control unit 20 in place of the real rotation speed of the engine 2.

REFERENCE SIGNS LIST 1 hydraulic pump
2 engine
3 electric motor
4 engine control dial
5 operating lever
11 engine power calculating unit
12 first rotation speed calculating unit
13 target maximum total power calculating unit
14 second rotation speed calculating unit
15 target flow rate calculating unit
16 third rotation speed calculating unit
17 target rotation speed calculating unit
18 engine control unit
19 electric motor control unit
20 hydraulic pump control unit

The invention claimed is:

1. A hybrid construction machine comprising: a variable displacement hydraulic pump which discharges hydraulic oil for a hydraulic actuator; an engine which drives the hydraulic pump; an electric motor which is driven by the engine to charge generated electric power into an electric storage device and which is driven by the electric power charged in the electric storage device so as to assist the engine to drive the hydraulic pump; and a controller which controls driving of the hydraulic pump, the engine and the electric motor; characterized in that:

the controller includes an engine power calculating unit which calculates power generated by the engine, a first rotation speed calculating unit which calculates a rotation speed of the engine to minimize fuel required for generating the engine power, a second rotation speed calculating unit which determines a lower limit of a target rotation speed of the engine, a target rotation speed calculating unit which selects a larger one of a first rotation speed outputted from the first rotation speed calculating unit and a second rotation speed outputted from the second rotation speed calculating unit, an engine control unit which controls the engine so as to make a real rotation speed of the engine approach the target rotation speed, a target flow rate calculating unit which calculates a target flow rate of the hydraulic oil discharged from the hydraulic pump, and a hydraulic pump control unit which controls displacement of the hydraulic pump based on the real rotation speed or the target rotation speed of the engine so that a flow rate of the hydraulic oil discharged from the hydraulic pump approaches the target flow rate;

a target maximum total power calculating unit which calculates a target maximum value of total power of the engine and the electric motor is provided;

the second rotation speed calculating unit calculates a minimum rotation speed of the engine required for generating the target maximum total power in the engine and the electric motor; and the target maximum total power calculating unit calculates the target maximum total power based on a dial position of an engine control dial.

2. A hybrid construction machine according to claim 1, characterized in that:

the target flow rate calculating unit calculates the target flow rate based on a dial position of an engine control dial and an amount of operation on an operating lever.

3. A hybrid construction machine according to claim 1, characterized in that:

the engine power calculating unit calculates the engine power based on an amount of fuel injection in the engine and the rotation speed of the engine.

4. A hybrid construction machine according to claim 1, characterized in that:

the engine power calculating unit calculates the engine power based on the discharge flow rate and a discharge pressure of the hydraulic pump, the power of the electric motor and a load of accessories.

5. A hybrid construction machine according to claim 1, characterized in that:

the second rotation speed calculating unit calculates a minimum rotation speed of the engine required for securing the target flow rate of the hydraulic pump.

6. A hybrid construction machine according to claim 1, wherein the controller increases displacement of the hydraulic pump when the real rotation speed of the engine decreases, and the controller decreases the displacement of the hydraulic pump when the real rotation speed of the engine increases.

7. A hybrid construction machine comprising: a variable displacement hydraulic pump which discharges hydraulic oil for a hydraulic actuator; an engine which drives the hydraulic pump; an electric motor which is driven by the engine to charge generated electric power into an electric storage device and which is driven by the electric power charged in the electric storage device so as to assist the engine to drive the hydraulic pump; and a controller which controls driving of the hydraulic pump, the engine and the electric motor; characterized in that:

the controller includes an engine power calculating unit which calculates power generated by the engine, a first rotation speed calculating unit which calculates a rotation speed of the engine to minimize fuel required for generating the engine power, a second rotation speed calculating unit which determines a lower limit of a target rotation speed of the engine, a target rotation speed calculating unit which selects a larger one of a first rotation speed outputted from the first rotation speed calculating unit and a second rotation speed outputted from the second rotation speed calculating unit, an engine control unit which controls the engine so as to make a real rotation speed of the engine approach the target rotation speed, a target flow rate calculating unit which calculates a target flow rate of the hydraulic oil discharged from the hydraulic pump, and a hydraulic pump control unit which controls displacement of the hydraulic pump based on the real rotation speed or the target rotation speed of the engine so that a flow rate of the hydraulic oil discharged from the hydraulic pump approaches the target flow rate;

a target maximum total power calculating unit which calculates a target maximum value of total power of the engine and the electric motor is provided;

the second rotation speed calculating unit calculates a minimum rotation speed of the engine required for generating the target maximum total power in the engine and the electric motor;

a third rotation speed calculating unit which calculates a minimum rotation speed of the engine required for securing the target flow rate of the hydraulic pump is further provided; and the target rotation speed calculating unit selects a largest value from the first rotation speed outputted from the first rotation speed calculating unit, the second rotation speed outputted from the second rotation speed calculating unit and a third rotation speed outputted from the third rotation speed calculating unit.

* * * * *